United States Patent
Zhang et al.

(10) Patent No.: US 11,190,007 B2
(45) Date of Patent: Nov. 30, 2021

(54) FAULT CURRENT CONTROLLER FOR A DIRECT CURRENT POWER GRID

(71) Applicants: STATE GRID JIANGSU ELECTRIC POWER CO., LTD., Nanjing (CN); STATE GRID JIANGSU ELECTRIC POWER CO., LTD. RESEARCH INSTITUTE, Jiangsu (CN); STATE GRID CORPORATION OF CHINA, Xicheng District Beijing (CN); JIANGSU ELECTRIC POWER RESEARCH INSTITUTE CO., LTD., Jiangsu (CN)

(72) Inventors: Chenyu Zhang, Jiangsu (CN); Yubo Yuan, Jiangsu (CN); Jinggang Yang, Jiangsu (CN); Shu Chen, Jiangsu (CN); Xiaodong Yuan, Jiangsu (CN); Jian Liu, Jiangsu (CN); Mingming Shi, Jiangsu (CN); Qun Li, Jiangsu (CN); Xuefeng Ge, Jiangsu (CN); Huiyu Miao, Jiangsu (CN); Ruihuang Liu, Jiangsu (CN); Yunlong Jiang, Jiangsu (CN)

(73) Assignees: STATE GRID JIANGSU ELECTRIC POWER CO., LTD., Nanjing (CN); STATE GRID JIANGSU ELECTRIC POWER CO., LTD. RESEARCH INSTITUTE, Jiangsu (CN); STATE GRID CORPORATION OF CHINA, Beijing (CN); JIANGSU ELECTRIC POWER RESEARCH INSTITUTE CO., LTD., Jiangsu (CN)

( * ) Notice: Subject to any disclaimer, the term of this patent is extended or adjusted under 35 U.S.C. 154(b) by 0 days.

(21) Appl. No.: 17/061,235

(22) Filed: Oct. 1, 2020

(65) Prior Publication Data

US 2021/0175705 A1  Jun. 10, 2021

(30) Foreign Application Priority Data

Dec. 10, 2019 (CN) .......................... 201911256301.X

(51) Int. Cl.
*H02H 7/26* (2006.01)
*H02H 1/00* (2006.01)
(Continued)

(52) U.S. Cl.
CPC .......... *H02H 7/268* (2013.01); *H02H 1/0007* (2013.01); *H02H 3/025* (2013.01);
(Continued)

(58) Field of Classification Search
CPC .. H02H 7/268; H02H 9/02–028; H02H 3/025; H02H 3/087; H02H 3/093
See application file for complete search history.

(56) References Cited

U.S. PATENT DOCUMENTS

| 5,995,392 A * | 11/1999 | Turner .................... H02H 9/001 323/908 |
| 2008/0160370 A1 * | 7/2008 | Masse ...................... H02H 9/02 429/429 |
| 2016/0359319 A1 * | 12/2016 | Kolhatkar ................ H02H 9/02 |

FOREIGN PATENT DOCUMENTS

WO    WO-2019234401 A  * 12/2019  ........... H01H 33/596

* cited by examiner

*Primary Examiner* — Jared Fureman
*Assistant Examiner* — Christopher J Clark
(74) *Attorney, Agent, or Firm* — Arent Fox LLP

(57) ABSTRACT

Disclosed is a fault current controller for a direct current power grid, which includes a primary circuit and a controller. The primary circuit includes an inductor, a filter capacitor, a resistor, an IGBT switch, a diode, a contactor and a Hall current sensor. The inductor, a first resistor and a second contactor are connected in series and are connected to a first contactor in parallel. A first branch including a second (Continued)

resistor and a first diode, a second branch including a third resistor and a second diode, and the inductor are connected in parallel; the filter capacitor, the IGBT switch and the first resistor are connected in parallel. The Hall current sensor is arranged in the series circuit. The controller controls the IGBT switch and the two contactors in the primary circuit to form different on-off combinations.

9 Claims, 3 Drawing Sheets

(51) Int. Cl.
   *H02H 3/087* (2006.01)
   *H02H 3/02* (2006.01)
   *H02H 9/02* (2006.01)
   *H02H 3/093* (2006.01)
(52) U.S. Cl.
   CPC ............ *H02H 3/087* (2013.01); *H02H 3/093* (2013.01); *H02H 9/02* (2013.01)

FAULT CURRENT CONTROLLER FOR A DIRECT CURRENT POWER GRID

CROSS-REFERENCE TO RELATED APPLICATIONS

This application claims priority to Chinese patent application No. CN201911256301.X filed with CNIPA on Dec. 10, 2019, the content of which is incorporated herein by reference in its entirety.

TECHNICAL FIELD

The present disclosure relates to a fault current controller for a direct current (DC) power grid, and particularly to a controller for protecting a direct current power supply from being locked immediately in case of a feeder fault in a low-voltage power distribution network, and belongs to the technical field of new topology and control of the low-voltage direct current power distribution network.

BACKGROUND

When a certain direct current load in a direct current power distribution network fails, a load feeder switch has not been switched off, and a direct current power supply will detect a fault current and is locked immediately (at μs level), which causes the whole direct current power distribution network is powered off, and other loads are also forced to be powered off.

SUMMARY

The present disclosure mainly aims to overcome defects in the related art and provide a fault current controller for a direct current power grid, which can realize the fault protection of the direct current power grid and avoid the power failure of a whole direct current power distribution network caused by a fact that a main power supply of the direct current power grid is locked due to a temporary feeder fault.

A fault current controller for a direct current power grid is provided. The fault current controller includes a primary circuit and a controller; the primary circuit includes an inductor, a filter capacitor, a resistor, an IGBT switch, a diode, a contactor and a Hall current sensor; the inductor, a first resistor and a second contactor are connected in series to form a series circuit; the series circuit and a first contactor are connected in parallel; a second resistor and a first diode are connected in series to form a first branch; a third resistor and a second diode are connected in series to form a second branch; both the first branch, the second branch and the inductor are connected in parallel; the filter capacitor, the IGBT switch and the first resistor are connected in parallel; the Hall current sensor is arranged in the series circuit; and the controller controls the IGBT switch and the two contactors in the primary circuit to form different on-off combinations, enabling different working modes of the primary circuit.

Furthermore, the working modes includes: mode 1: a normal operation working condition; mode 2: an instantaneous fault working condition; mode 3: a permanent fault working condition; and mode 4: a bypass shutdown working condition.

Furthermore, the primary circuit has two ports D1 and D2, and is connected in series in a wire to be protected in the direct current power grid through the two ports D1 and D2.

Furthermore, when the controller controls the IGBT switch to be switched on, the second contactor to be switched on, and the first contactor K1 to be switched off, the primary circuit is in the normal operation working condition.

Furthermore, when the controller controls the IGBT switch to be switched off, the second contactor to be switched on, and the first contactor to be switched off, the primary circuit is in the instantaneous fault working condition.

Furthermore, when the controller controls the IGBT switch to be switched off, the second contactor to be switched off, and the first contactor to be switched off, the primary circuit is in the permanent fault working condition.

Furthermore, when the controller controls the IGBT switch to be switched off, the second contactor to be switched off, and the first contactor to be switched on, the primary circuit is in the bypass shutdown working condition.

Furthermore, the Hall current sensor is arranged beside the second contactor in the series circuit and is configured to measure a current flowing through the second contactor.

Furthermore, the working modes include: mode 1, mode 2, mode 3 and mode 4. In mode 1, the IGBT switch is switched on, the second contactor is switched on, and the first contactor K1 is switched off, the primary circuit is in a normal operation working condition; in mode 2, the IGBT switch is switched off, the second contactor is switched on, and the first contactor is switched off, the primary circuit is in an instantaneous fault working condition; in mode 3, when the IGBT switch is switched off, the second contactor is switched off, and the first contactor is switched off, the primary circuit is in a permanent fault working condition; and in mode 4, when the IGBT switch is switched off, the second contactor is switched off, and the first contactor is switched on, the primary circuit is in a bypass shutdown working condition; a protection threshold includes a first threshold I1 and a second threshold I2, and I1<I2; self-inspection is performed to determine whether there is a fault in a device, and when the fault exists, the primary circuit works in the mode 4; when a direct current power distribution network operates normally, the primary circuit works in the mode 1; when 3 points are continuously sampled and are greater than the first threshold I1 or 1 point is sampled and is greater than the second threshold I2, the IGBT switch of the primary circuit is switched off, the wire is considered to be in fault, and the mode 2 is entered; when the mode 2 lasts for more than a first set time period or the mode 2 is entered two times within a continuous second set time period, the second contactor K is switched off, it is considered to be a permanent fault, and the mode 3 is entered.

The mode 4 is the bypass working condition, and will not be used under a normal condition of the device.

DETAILED DESCRIPTION

The present disclosure will be further described below in conjunction with the drawings.

According to the present disclosure, a DC fault current controller is added to a direct current power grid, when the DC fault current controller detects the fault current, the DC fault current controller may cooperate with a direct current power supply to protect strategies so as to limit a current value of the wire and protect the direct current power supply, and a normal operation mode is restored after a fault feeder is disconnected.

A fault current controller for a direct current power grid of the present disclosure works for a direct current power distribution network and includes a primary circuit and a controller.

Figure 1:
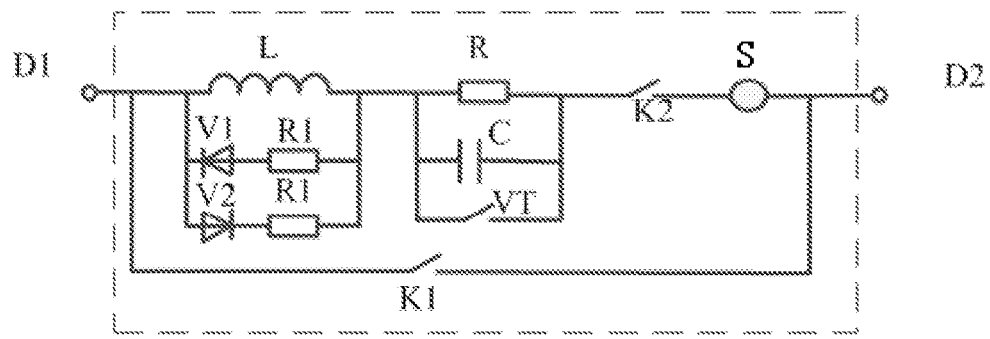
FIG. 1 is a schematic diagram of a topology structure of a fault current controller for a direct current power grid according to the present disclosure.

The primary circuit as shown in FIG. 1 includes one inductor L, one filter capacitor C, three resistors R, R1, R2, one IGBT switch VT, two diodes V1, V2, two contactors K1, K2, and one Hall current sensor S. The resistor R1 and the diode V1 are connected in series to form a first series branch. The resistor R2 and the diode V2 are connected in series to form a second series branch. The first series branch, the second series branch and the inductor L are connected in parallel, the filter capacitor C, the resistance R and the IGBT switch VT are connected in parallel; the inductance L, the resistance R and the contactor K2 are connected in series, and then integrally connected to the contactor K1 in parallel. The Hall current sensor is configured to measure a current flowing through the contactor K2.

Figure 2:
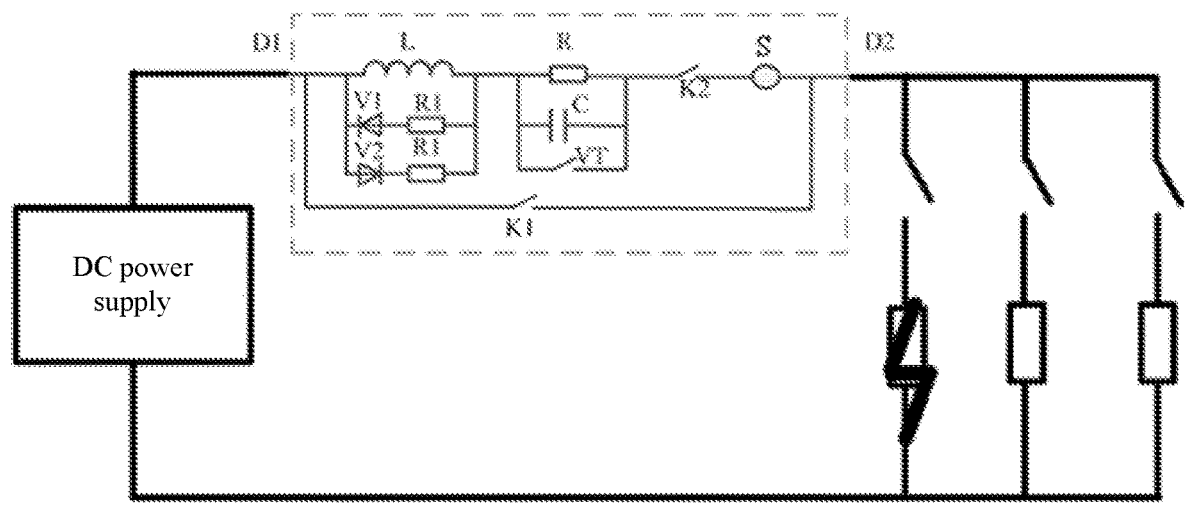
FIG. 2 is a typical manner of connecting a fault current controller for a direct current power grid into a direct current power distribution network according to the present disclosure.

The primary circuit has two ports D1 and D2, and is connected in series in a wire to be protected in the direct current power grid through the two ports D1 and D2, as shown in FIG. 2.

The controller may control the IGBT switch and the two contactors in the primary circuit to form different on-off combinations, enabling four different working modes of the primary circuit. The four working modes of the DC fault current controller are described below.

Figure 3:
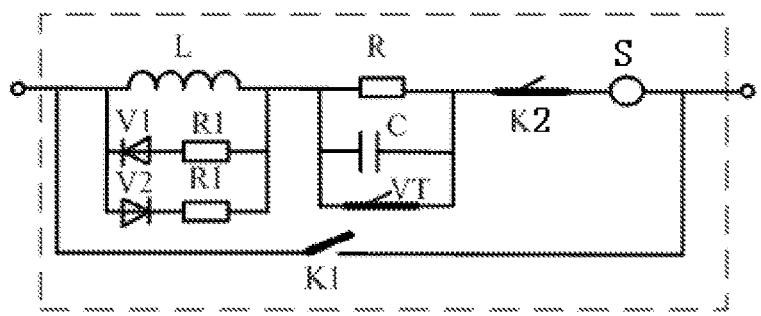
FIG. 3 is a primary circuit in mode 1 of a normal operation working condition.
Figure 4:
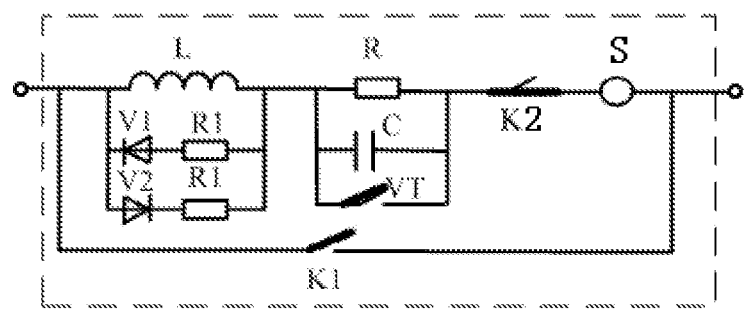
FIG. 4 is a primary circuit in mode 2 of an instantaneous fault working condition.
Figure 5:
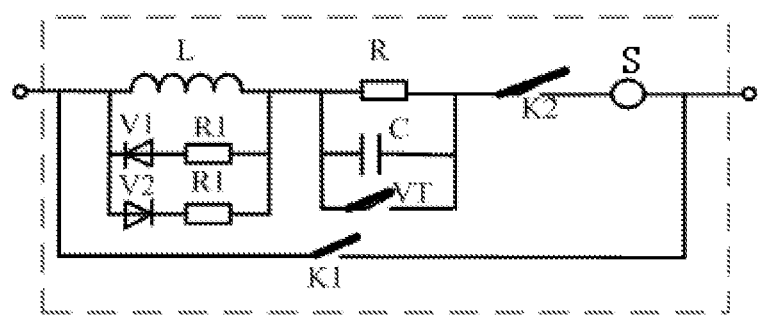
FIG. 5 is a primary circuit in mode 3 of a permanent fault working condition.
Figure 6:
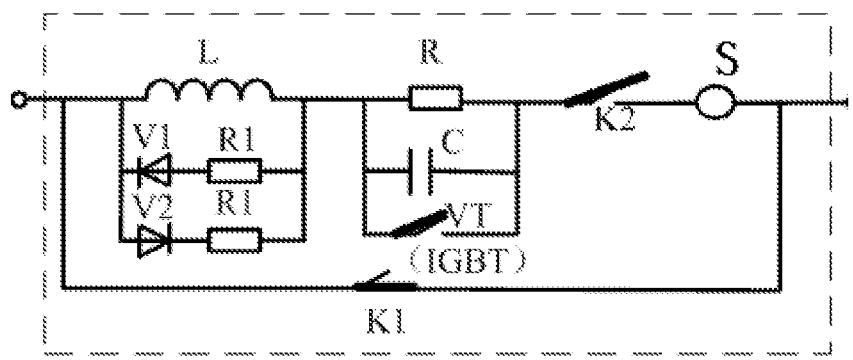
FIG. 6 is a primary circuit in mode 4 of a bypass shutdown working condition.

Mode 1 is a normal operation working condition, as shown in FIG. 3; mode 2 is an instantaneous fault working condition, as shown in FIG. 4; mode 3 is a permanent fault working condition, as shown in FIG. 5; and mode 4 is a bypass shutdown working condition, as shown in FIG. 6.

In the normal operation working condition, as shown in FIG. 3, the IGBT switch VT is switched on, the contactor K2 is switched on, and the contactor K1 is switched off.

In the instantaneous fault working condition, as shown in FIG. 4, the IGBT switch VT is switched off, the contactor K2 is switched on, and the contactor K1 is switched off.

In the permanent fault working condition, as shown in FIG. 5, the IGBT switch VT is switched off, the contactor K2 is switched off, and the contactor K1 is switched off.

In the bypass shutdown working condition, as shown in the FIG. 6, the IGBT switch VT is switched off, the contactor K2 is switched off, and the contactor K1 is switched on.

Figure 7:
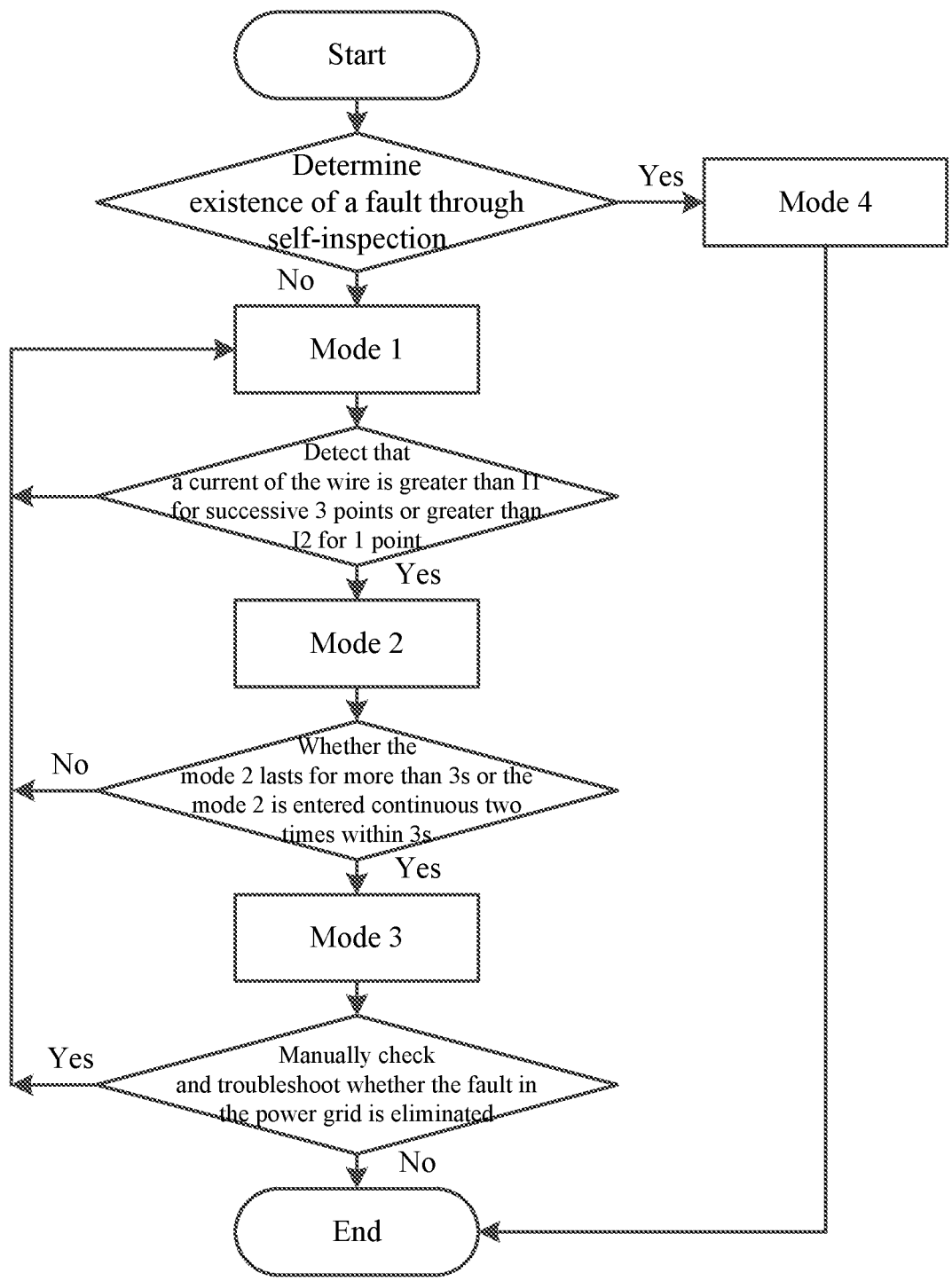
FIG. 7 is a block diagram of a control logic of a controller of the present disclosure.

A control logic of the controller described above is shown in FIG. 7, a protection threshold is set as I1 and I2 (I1<I2), a sampling rate is set as f, the fault current controller for the direct current power grid performs self-inspection on a device to determine whether a fault exists in the device, and the primary circuit works in the mode 4 if the fault exists. When the direct current power distribution network operates normally, the primary circuit works in the mode 1. When 3 points are continuously sampled and are greater than I1 or 1 point is sampled and is greater than I2, the wire is considered to be in fault, the VT of the primary circuit is open, and the mode 2 is entered. When the mode 2 lasts for more than 3 seconds or the mode 2 is entered two times within 3 seconds, the fault is considered to be a permanent fault, the K2 is open, and the mode 3 is entered. The mode 4 is the bypass working condition, and will not be used under a normal condition of the device.

The innovation point of the present disclosure lies in that according to the DC fault current controller for the current power grid provided by the present disclosure, when the DC fault current controller detects the fault current, the DC fault current controller may cooperate with a direct current power supply to protect strategies so as to limit a current value of the wire and protect the direct current power supply, and a normal operation mode is restored after a fault feeder is disconnected, which avoids the power failure of the whole direct current power distribution network caused by the fact that the main power supply of the direct current power grid is locked due to the temporary feeder fault.

The basic principles, main features and advantages of the present disclosure are shown and described above. It will be appreciated by those skilled in the art that the present disclosure is not limited by the above-described embodiments, and that the above-described embodiments and the Description are merely illustrative of the principles of the present disclosure, and that various changes and modifications will be made by the present disclosure without departing from the spirit and scope of the present disclosure, which fall within the scope of the claimed present disclosure. The scope of protection of the present disclosure is defined by the appended claims and equivalents thereof

What is claimed is:

1. A fault current controller for a direct current power grid, comprising:
    a primary circuit, wherein the primary circuit comprises an inductor, a filter capacitor, a first resistor, a second resistor, a third resistor, an IGBT switch, a first diode, a second diode, a first contactor, a second contactor, and a Hall current sensor;
    wherein the inductor, the first resistor and the second contactor are connected in series to form a series circuit; wherein the series circuit and the first contactor are connected in parallel;
    wherein the second resistor and the first diode are connected in series to form a first branch; wherein the third resistor and the second diode are connected in series to form a second branch; wherein the first branch, the second branch and the inductor are connected in parallel;
    wherein the filter capacitor, the IGBT switch and the first resistor are connected in parallel;
    wherein the Hall current sensor is arranged in the series circuit; and
    a controller, which is configured to control the IGBT switch, the first contactor and the second contactor in the primary circuit to form different on-off combinations, enabling different working modes of the primary circuit.

2. The fault current controller for the direct current power grid of claim 1, wherein the working modes comprise:
   mode 1: a normal operation working condition;
   mode 2: an instantaneous fault working condition;
   mode 3: a permanent fault working condition; and
   mode 4: a bypass shutdown working condition.

3. The fault current controller for the direct current power grid of claim 1, wherein the primary circuit has two ports, and is connected in series in a wire to be protected in the direct current power grid through the two ports.

4. The fault current controller for the direct current power grid of claim 1, wherein in a case where the controller controls the IGBT switch to be switched on, the second contactor to be switched on, and the first contactor K1 to be switched off, the primary circuit is in a normal operation working condition.

5. The fault current controller for the direct current power grid of claim 1, wherein in a case where the controller controls the IGBT switch to be switched off, the second contactor to be switched on, and the first contactor to be switched off, the primary circuit is in an instantaneous fault working condition.

6. The fault current controller for the direct current power grid of claim 1, wherein in a case where the controller controls the IGBT switch to be switched off, the second contactor to be switched off, and the first contactor to be switched off, the primary circuit is in a permanent fault working condition.

7. The fault current controller for the direct current power grid of claim 1, wherein in a case where the controller controls the IGBT switch to be switched off, the second contactor to be switched off, and the first contactor to be switched on, the primary circuit is in a bypass shutdown working condition.

8. The fault current controller for the direct current power grid of claim 1, wherein the Hall current sensor is arranged beside the second contactor in the series circuit and is configured to measure a current flowing through the second contactor.

9. The fault current controller for the direct current power grid of claim 1, wherein the working modes comprise:
   mode 1: the IGBT switch is switched on, the second contactor is switched on, and the first contactor K1 is switched off, the primary circuit is in a normal operation working condition;
   mode 2: the IGBT switch is switched off, the second contactor is switched on, and the first contactor is switched off, the primary circuit is in an instantaneous fault working condition;
   mode 3: when the IGBT switch is switched off, the second contactor is switched off, and the first contactor is switched off, the primary circuit is in a permanent fault working condition; and
   mode 4: when the IGBT switch is switched off, the second contactor is switched off, and the first contactor is switched on, the primary circuit is in a bypass shutdown working condition;
wherein self-inspection is performed to determine whether there is a fault in a device, and in a case where the fault exists, the primary circuit works in the mode 4;
wherein in a case where a direct current power distribution network operates normally, the primary circuit works in the mode 1;
wherein in a case where 3 points are continuously sampled and are greater than a first threshold I1 or 1 point is sampled and is greater than a second threshold I2, the IGBT switch of the primary circuit is switched off, and the mode 2 is entered; wherein I1<I2;
wherein in a case where the mode 2 lasts for more than a first set time period or the mode 2 is entered two times within a continuous second set time period, the second contactor K is switched off, and the mode 3 is entered.

* * * * *

UNITED STATES PATENT AND TRADEMARK OFFICE
CERTIFICATE OF CORRECTION

| | |
|---|---|
| PATENT NO. | : 11,190,007 B2 |
| APPLICATION NO. | : 17/061235 |
| DATED | : November 30, 2021 |
| INVENTOR(S) | : Chenyu Zhang et al. |

It is certified that error appears in the above-identified patent and that said Letters Patent is hereby corrected as shown below:

In the Claims

Column 5, Claim 4, Line 14, delete "K1".

Column 6, Claim 9, Line 7, delete "K1".

Column 6, Claim 9, Line 34, delete "K".

Signed and Sealed this
Sixth Day of September, 2022

Katherine Kelly Vidal
*Director of the United States Patent and Trademark Office*